US012746651B2

(12) United States Patent
Wang et al.

(10) Patent No.: US 12,746,651 B2
(45) Date of Patent: Sep. 29, 2026

(54) CAP FEEDING DEVICE AND CAP NAILER HAVING THE SAME

(71) Applicant: BASSO INDUSTRY CORP., Taichung (TW)

(72) Inventors: Sheng-Man Wang, Taichung (TW); Liang-Chi Hung, Taichung (TW); Li-Hsin Chang, Taichung (TW); Cheng-En Tsai, Taichung (TW)

(73) Assignee: BASSO INDUSTRY CORP., Taichung (TW)

(*) Notice: Subject to any disclaimer, the term of this patent is extended or adjusted under 35 U.S.C. 154(b) by 0 days.

(21) Appl. No.: 18/680,077

(22) Filed: May 31, 2024

(65) Prior Publication Data

US 2024/0408729 A1 Dec. 12, 2024

(30) Foreign Application Priority Data

Jun. 6, 2023 (TW) ................................ 112121094

(51) Int. Cl.
*B25C 1/00* (2006.01)
*B25C 5/15* (2006.01)

(52) U.S. Cl.
CPC ................ *B25C 1/005* (2013.01); *B25C 5/15* (2013.01)

(58) Field of Classification Search
CPC .......... B25C 1/005; B25C 5/15; B25C 5/1693
See application file for complete search history.

(56) References Cited

U.S. PATENT DOCUMENTS

| | | | | |
|---|---|---|---|---|
| 5,339,983 | A * | 8/1994 | Caple | B65H 20/22 227/138 |
| 5,947,362 | A * | 9/1999 | Omli | B25C 5/1693 227/120 |
| 6,302,310 | B1 * | 10/2001 | Lamb | B25C 5/1693 227/119 |
| 6,478,209 | B1 * | 11/2002 | Bruins | B25C 5/1693 227/16 |
| 6,779,700 | B2 * | 8/2004 | Bruins | B25C 1/006 227/18 |
| 6,968,945 | B2 * | 11/2005 | Bruins | B25C 1/006 206/820 |
| 8,534,527 | B2 * | 9/2013 | Brendel | B25C 1/06 227/132 |
| 10,814,464 | B2 * | 10/2020 | Orchard | B65D 85/62 |
| 10,960,525 | B2 * | 3/2021 | Vandenberg | B25C 1/003 |

(Continued)

*Primary Examiner* — Thomas M Wittenschlaeger
*Assistant Examiner* — Katie L Gerth
(74) *Attorney, Agent, or Firm* — Burris Law, PLLC

(57) ABSTRACT

A cap feeding device is for a nap nailer that includes a machine body, a muzzle, a nail feeding device, a nail striking device, and an electronic control device. The cap feeding device includes a cartridge, a cap rail, a cap solenoid valve, and a cap pushing member. The cartridge is adapted for accommodating a plurality of caps. The cap rail is connected to the cartridge, and extends toward the muzzle. The cap solenoid valve is mounted to the cap rail, and includes a valve rod that is drivable by an electromagnetic force to move. The cap pushing member is swingably connected to the valve rod, and is urged by the valve rod to move relative to the muzzle between a first position, in which the cap pushing member is adjacent to the muzzle, and a second position, in which the cap pushing member is distal from the muzzle.

16 Claims, 13 Drawing Sheets

(56) References Cited

U.S. PATENT DOCUMENTS

| | | | | |
|---|---|---|---|---|
| 2003/0015565 | A1* | 1/2003 | Lee | B25C 5/1693 227/18 |
| 2003/0057248 | A1* | 3/2003 | Bruins | B25C 1/003 227/18 |
| 2003/0213829 | A1* | 11/2003 | Bruins | B25C 5/1693 227/99 |
| 2004/0197162 | A1* | 10/2004 | Lamb | B25C 1/006 411/442 |
| 2008/0302847 | A1* | 12/2008 | Liu | B25C 5/1693 227/16 |
| 2009/0114697 | A1* | 5/2009 | Gross | B25C 1/001 227/120 |
| 2009/0250500 | A1* | 10/2009 | Brendel | B25C 5/15 227/132 |
| 2009/0308906 | A1* | 12/2009 | Lamb | B25C 5/1693 227/119 |
| 2012/0067934 | A1* | 3/2012 | Li | B25C 1/06 227/8 |
| 2014/0305068 | A1* | 10/2014 | Svanberg | E04D 3/362 206/340 |
| 2017/0100828 | A1* | 4/2017 | Chien | B25C 1/06 |
| 2017/0106513 | A1* | 4/2017 | Orchard | B25C 5/1693 |
| 2018/0223547 | A1* | 8/2018 | Demuth | B25C 7/00 |
| 2022/0161404 | A1* | 5/2022 | Lim | B25C 1/003 |
| 2023/0137720 | A1* | 5/2023 | Aizawa | B25C 1/047 227/129 |

* cited by examiner

CAP FEEDING DEVICE AND CAP NAILER HAVING THE SAME

CROSS-REFERENCE TO RELATED APPLICATION

This application claims priority to Taiwanese Invention Patent Application No. 112121094, filed on Jun. 6, 2023, the entire disclosure of which is incorporated by reference herein.

FIELD

The disclosure relates to a cap nailer, and more particularly to an electric cap nailer and a cap feeding device thereof.

BACKGROUND

A tool disclosed in U.S. Pat. No. 10,960,525B2 pushes a fastener (hereinafter nail) and a cap to a driving station mainly through energy that is stored in a resilient component. Then, the tool advances the nail, via electrical energy that is stored in a battery, through the cap and a sheet object (e.g., fabrics, wallpaper, or panels) to secure the sheet object to a substrate. As such, in addition to the nail that interconnects the sheet object and the substrate, the sheet object is further pressed toward the substrate by the cap, thereby enhancing robustness of a combination of the sheet object and the substrate and better securing the sheet object to the substrate.

However, the aforesaid energy that pushes the nail and the cap comes from an elastic force that is provided by a bell crank of the tool. When storing the energy in the resilient component, a user has to apply an external force to press a pressure foot of the tool to generate mechanical energy that drives the bell crank. The bell crank is operable via the elastic force and the external force among a neutral mode, a ready mode, and an advance mode. Thus, the bell crank not only has a complex structure and a high manufacturing cost, but is also difficult to be assembled and disassembled for maintenance. Moreover, the resilient component may obstruct movement of the user when the user presses the pressure foot to drive operation of the bell crank, thereby reducing smoothness of a nail striking operation of the tool.

SUMMARY

Therefore, an object of the disclosure is to provide a cap feeding device that can alleviate at least one of the drawbacks of the prior art.

According to the disclosure, the cap feeding device is for a nap nailer. The cap nailer includes a machine body, a muzzle, a nail feeding device, a nail striking device, and an electronic control device. The muzzle is connected to the machine body, and extends in an extending direction of a first axis. The nail feeding device is connected to the muzzle, and is operable to push a plurality of nails in an extending direction of a second axis such that the nails enter the muzzle one by one. The nail striking device is mounted to the machine body, and is drivable by an electric power to strike any one of the nails that is in the muzzle. The electronic control device is mounted to the machine body, and includes a battery unit for supplying electrical energy. The cap feeding device includes a cartridge, a cap rail, a cap solenoid valve, and a cap pushing member. The cartridge is connected to the machine body, and is adapted for accommodating a plurality of caps. The cap rail is connected to the cartridge, and extends toward the muzzle in an extending direction of a third axis. The cap rail is adapted for urging the caps to be arranged therealong in the extending direction of the third axis. The third axis and the first axis intersect, and cooperatively define an intersection point that is spaced apart from the muzzle. The third axis and the second axis define an included angle therebetween. The cap solenoid valve is mounted to the cap rail, and includes a valve rod that is drivable by an electromagnetic force to move in the extending direction of the third axis. The cap pushing member is swingably connected to the valve rod, and is urged by the valve rod to move relative to the muzzle between a first position, in which the cap pushing member is adjacent to the muzzle, and a second position, in which the cap pushing member is distal from the muzzle. The cap pushing member is adapted to be pushed by an adjacent one of the caps to swing away from the cap rail and slip off the adjacent one of the caps when the cap pushing member is urged to move from the first position toward the second position. The cap pushing member is prevented from swinging by the adjacent one of the caps and the cap rail, and is adapted to push the adjacent one of the caps toward the intersection point when the cap pushing member is urged to move from the second position toward the first position.

Another object of the disclosure is to provide a cap nailer that can alleviate at least one of the drawbacks of the prior art.

According to the disclosure, the cap nailer includes a machine body, a muzzle, a nail feeding device, a nail striking device, an electronic control device, and the cap feeding device as claimed above. The muzzle is connected to the machine body, and extends in an extending direction of a first axis. The nail feeding device is connected to the muzzle, and is adapted for pushing a plurality of nails in an extending direction of a second axis such that the nails enter the muzzle one by one. The nail striking device is mounted between the machine body and the muzzle, and is drivable by an electric power to strike any one of the nails that is in the muzzle. The electronic control device is mounted to the machine body, and includes a battery unit for supplying electrical energy. The cap feeding device is disposed between the machine body and the muzzle.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
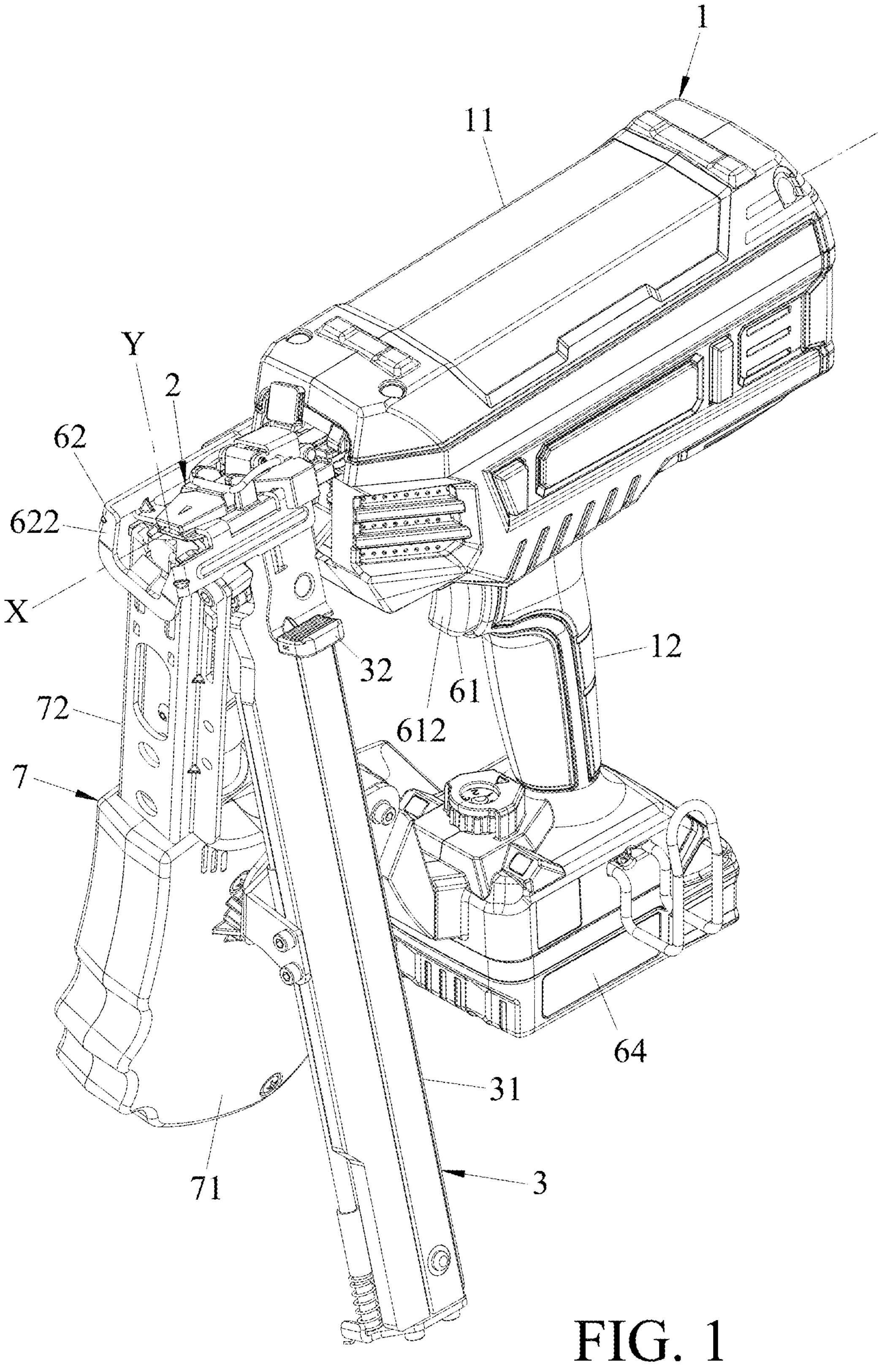
FIG. 1 is a perspective view of an embodiment of a cap nailer according to the disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
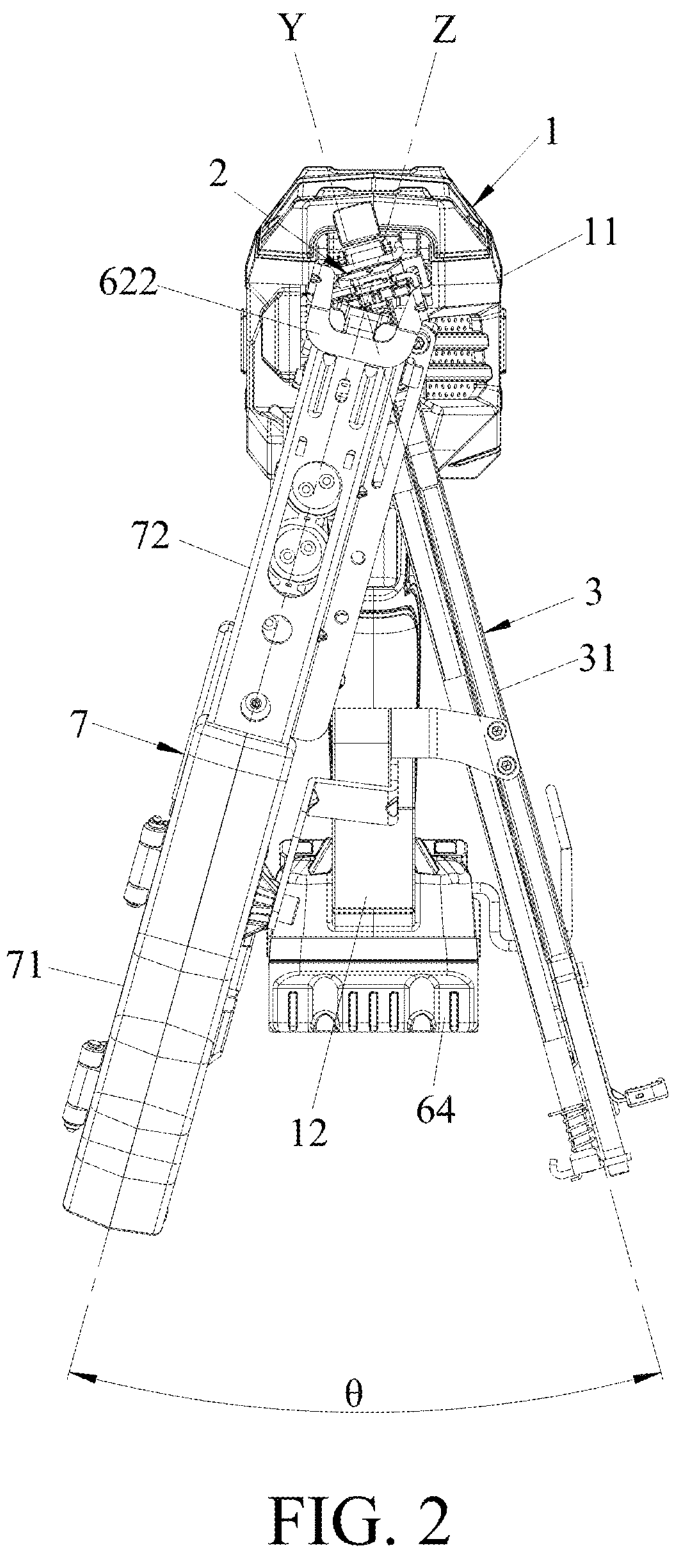
FIG. 2 is a front view of the embodiment.
Figure 3:
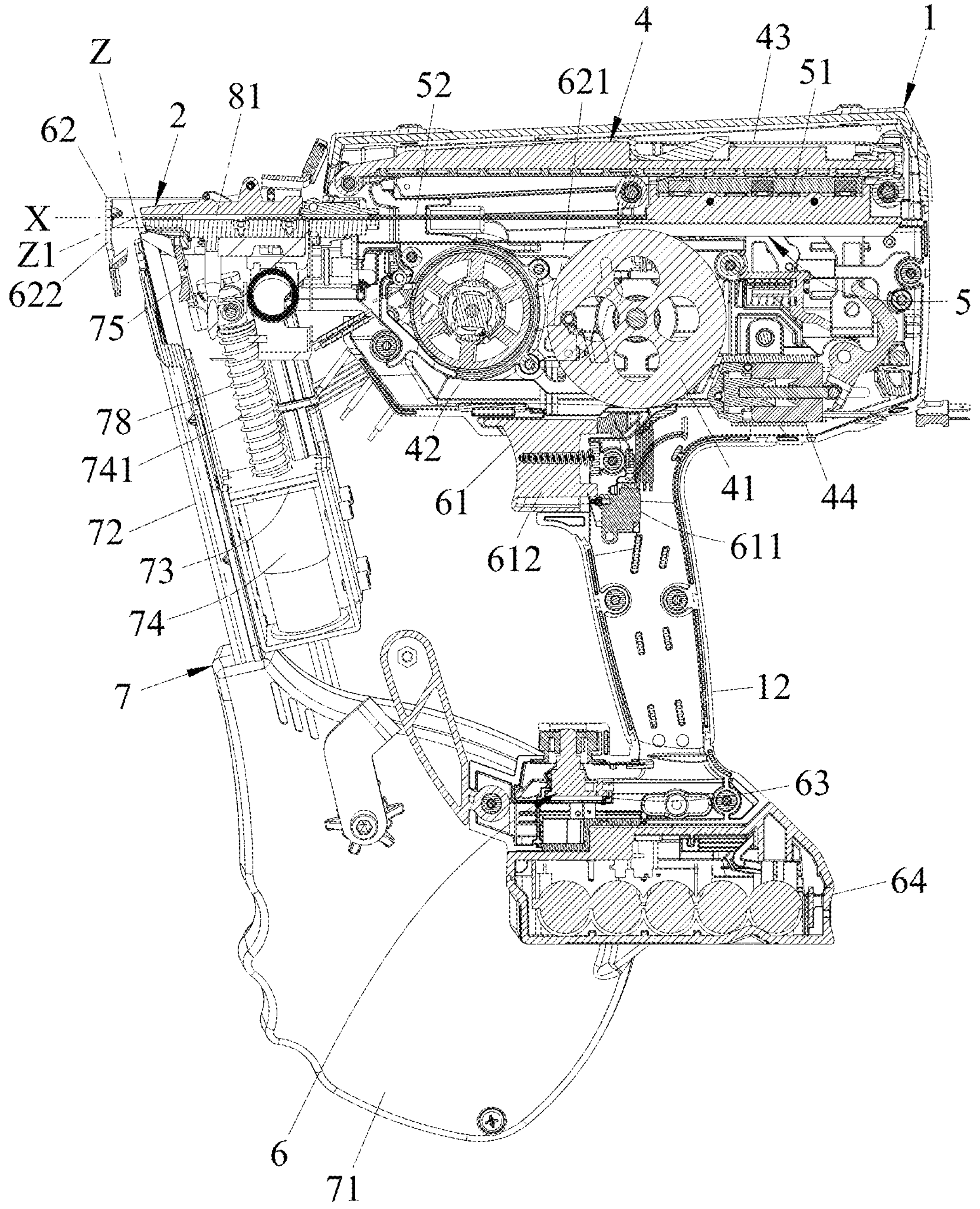
FIG. 3 is a sectional view of the embodiment.
Figure 4:
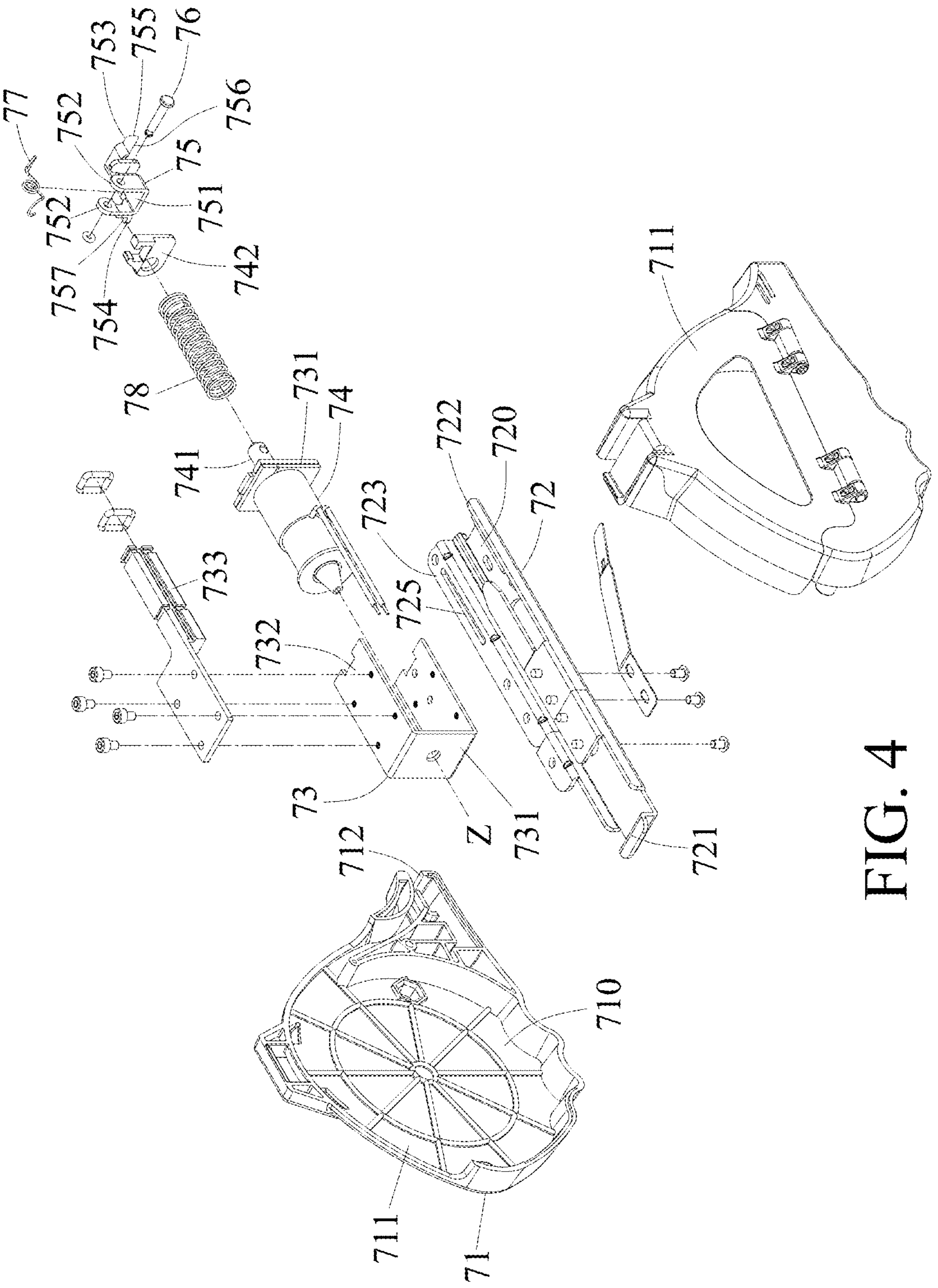
FIG. 4 is a partly exploded perspective view of a cap feeding device of the embodiment.
Figure 5:
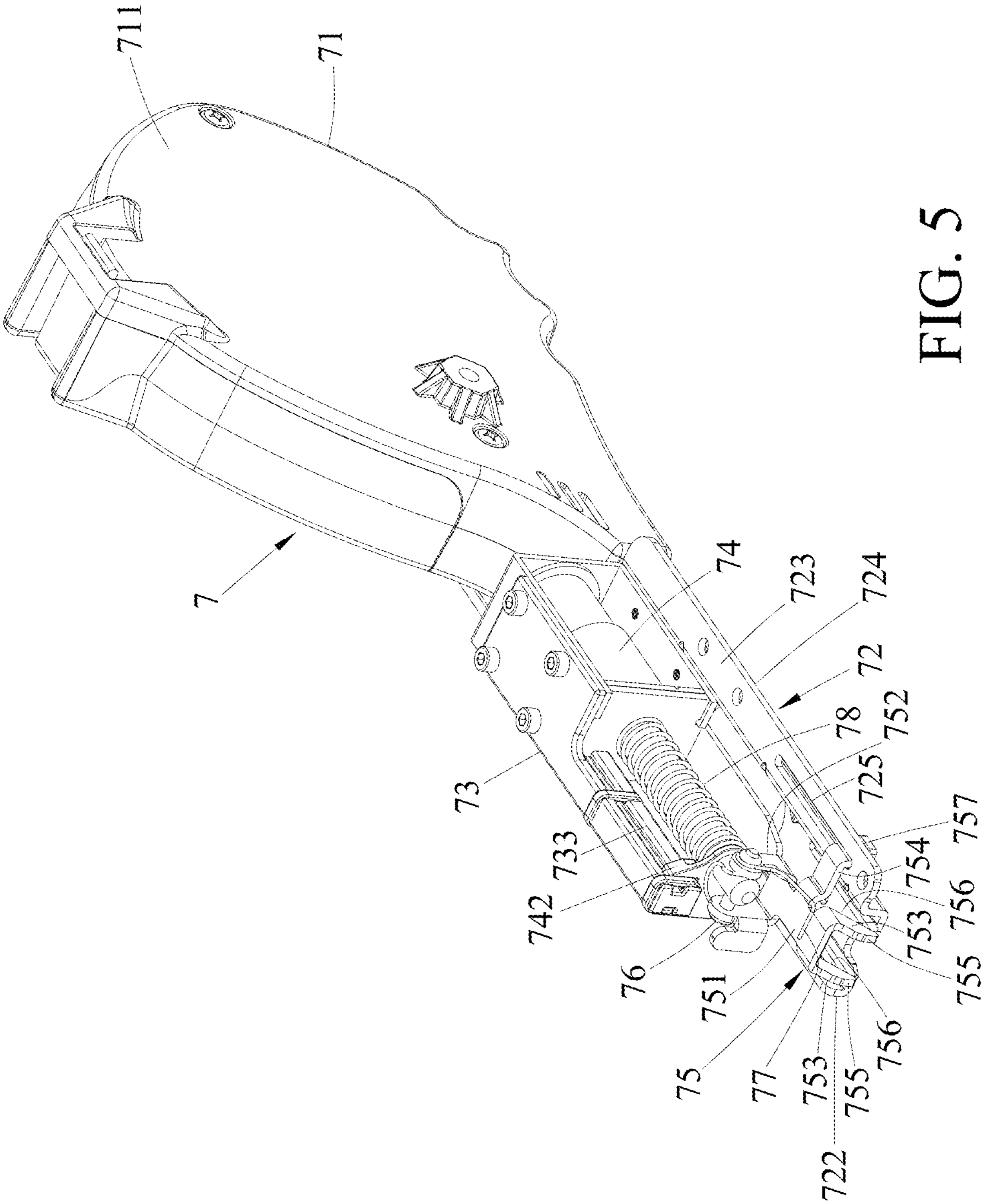
FIG. 5 is a perspective view of the cap feeding device.
Figure 6:
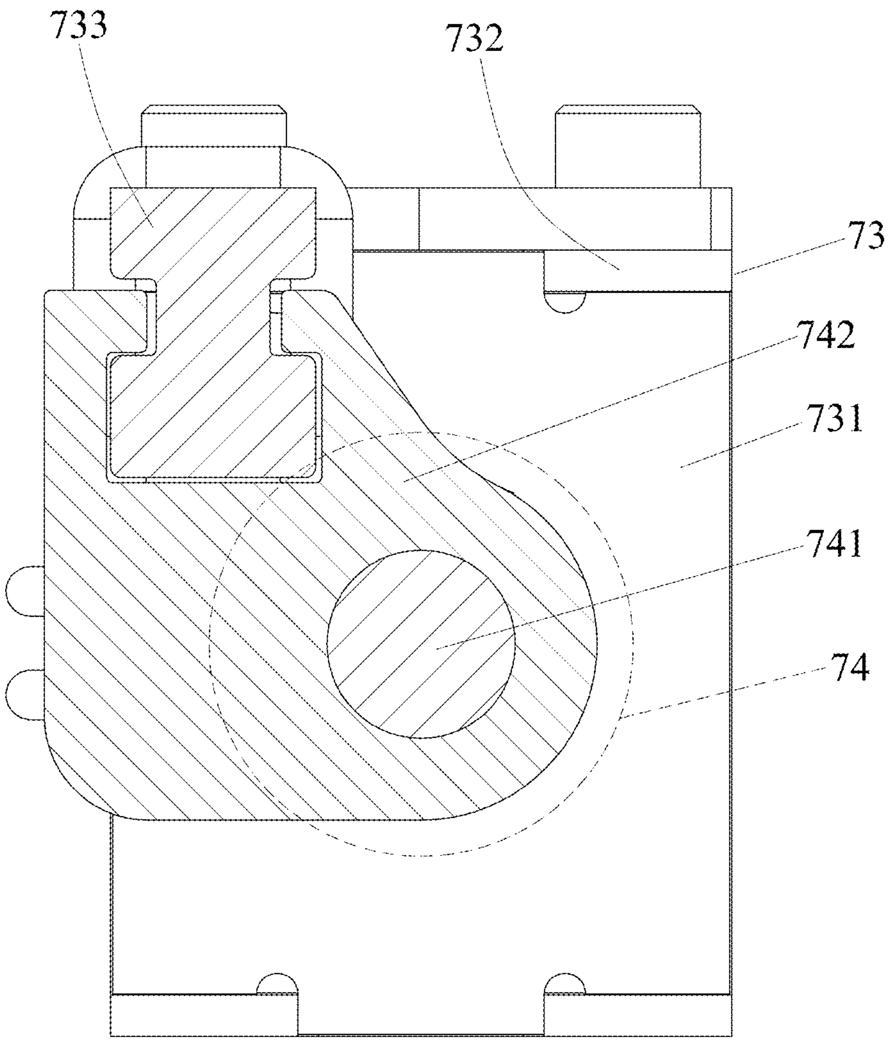
FIG. 6 is a sectional view of the cap feeding device.

Referring to FIGS. 1 to 3, an embodiment of a cap nailer according to the disclosure includes a machine body 1, a muzzle 2, a nail feeding device 3, a driving device 4, a nail striking device 5, an electronic control device 6, and a cap feeding device 7.

The machine body 1 includes a main body portion 11, and a grip portion 12 that is connected to the main body portion 11 and that is for a user to grip.

The muzzle 2 is connected to the main body portion 11 of the machine body 1, and extends in an extending direction of a first axis (X).

The nail feeding device 3 is connected to the muzzle 2. The nail feeding device 3 includes a magazine 31 that is connected to the machine body 1 and the muzzle 2, and that is adapted for accommodating a plurality of nails 81, and a nail pushing member 32 that is movably connected to the magazine 31. The magazine 31 extends in an extending direction of a second axis (Y) that intersects with the first axis (X). The nail pushing member 32 is drivable by a biasing force to move along the second axis (Y), and is adapted for pushing the nails 81 to move toward the muzzle 2 along the second axis (Y) (i.e., pushing the nails 81 in the extending direction of the second axis (Y)) such that the nails 81 enter the muzzle 2 one by one. It is noted that, the manner of the nails 81 being accommodated in the magazine 31 and the manner of the nails 81 entering the muzzle 2 one by one are widely-understood by those skilled in the art, detailed descriptions thereof are omitted, and only one of the nails 81 that has entered the muzzle 2 is shown in the figures for illustrating operation of the embodiment.

The driving device 4 includes a flywheel 41 that is rotatably disposed on the machine body 1, a motor 42 that is disposed on the machine body 1 and that drives the flywheel 41 to rotate, a swing arm unit 43 that is pivotably connected to the machine body 1, and a swing arm solenoid valve 44 that is disposed on the machine body 1 and that is operable to urge the swing arm unit 43 to pivot relative to the flywheel 41.

The nail striking device 5 is mounted between the machine body 1 and the muzzle 2, and is drivable by an electric power to strike any one of the nails 81 that is in the muzzle 2. Specifically, the nail striking device 5 includes an impact member 51 that is movably disposed on the swing arm unit 43 and that is movable along the first axis (X), and a nail striking member 52 that is connected to the impact member 51 and that partially extends into the muzzle 2. When the impact member 51 is urged by the swing arm unit 43 to be in contact with the flywheel 41, the impact member 51 is thrown by rotation of the flywheel 41 to urge the nail striking member 52 to strike any one of the nails 81 that is in the muzzle 2.

The electronic control device 6 is mounted to the machine body 1, and includes a trigger unit 61, a safety unit 62, a control unit 63, and a battery unit 64.

The trigger unit 61 includes a trigger switch 611 that is mounted to the grip portion 12 of the machine body 1, and a trigger 612 that is movably connected to the machine body 1, and that is located between the main body portion 11 and the grip portion 12. The trigger 612 is operable (i.e., the user may press the trigger 612 to operate the trigger 612). When the trigger 612 is operated, the trigger switch 611 outputs an activation signal.

The safety unit 62 includes a safety switch 621 that is mounted to the main body portion 11 of the machine body 1, and a safety member 622 that is disposed between the main body portion 11 and the muzzle 2, and that is movable along the first axis (X). The safety member 622 is operable. When the safety member 622 is operated, the safety switch 621 outputs a safety signal.

The control unit 63 is signally connected to the motor 42, the trigger switch 611, the safety switch 621, and the swing arm solenoid valve 44, is for receiving the activation signal and the safety signal, and controls the motor 42 so that the motor 42 may be activated or shut down by the control unit 63.

The battery unit 64 is electrically coupled to the control unit 63, and is for supplying electric energy to the motor 42, the trigger switch 611, the safety switch 621, and the swing arm solenoid valve 44.

It is noted that, the machine body 1, the muzzle 2, the nail feeding device 3, the driving device 4, the nail striking device 5, and the electronic control device 6 have known configurations, and relevant descriptions thereof may be found in Taiwanese Patent Publication No. 201827173A. There will be no further detailed descriptions on the machine body 1, the muzzle 2, the nail feeding device 3, the driving device 4, the nail striking device 5, and the electronic control device 6 since the details thereof may be deduced from the above descriptions by those skilled in the art.

Referring to FIGS. 2 to 5, the cap feeding device 7 is disposed between the machine body 1 and the muzzle 2, and includes a cartridge 71, a cap rail 72, a frame 73, a cap solenoid valve 74, a cap pushing member 75, a pin element 76, a resilient element 77, and a restoring element 78.

The cartridge 71 is connected to the machine body 1, and includes two cartridge casings 711 that are coupled to each other and that cooperatively define a cap accommodating space 710. The cap accommodating space 710 is adapted for accommodating a plurality of caps 82 (see FIG. 7). The cartridge casings 711 further define an outlet 712 that spatially communicates with the cap accommodating space 710, and that is adapted for the caps 82 to pass through one by one when the caps 82 are moved from the cap accommodating space 710 toward the cap rail 72. In this embodiment, the caps 82 are connected as a string, and the string of the caps 82 is wound.

The cap rail 72 is connected to the cartridge 71, and extends toward the muzzle 2 in an extending direction of a third axis (Z). The cap rail 72 has an import end 721 that is adjacent to the outlet 712, an export end 722 that is opposite to the import end 721 and that is adjacent to the muzzle 2, a first surface 723 that interconnects the import end 721 and the export end 722, and that cooperates with the import end 721 and the export end 722 to define a rail slot 720, a second surface 724 that is opposite to the first surface 723, and an elongated hole 725 that extends from the first surface 723 to the second surface 724, and that is elongated in the extending direction of the third axis (Z). The safety member 622 of the safety unit 62 and the export end 722 of the cap rail 72 cooperatively define a gap 726 therebetween. The rail slot 720 is adapted for urging the caps 82 to be arranged therealong in the extending direction of the third axis (Z) (see FIG. 7). The third axis (Z) and the first axis (X) intersect, and cooperatively define an intersection point (Z1) that is spaced apart from the muzzle 2 along the first axis (X). The third axis (Z) and the second axis (Y) define an included angle (θ) therebetween. The intersection point (Z1) is located in the gap 726. In this embodiment, when being observed from the extending direction of the first axis (X), the included angle (θ) defined by the third axis (Z) and the second axis (Y) ranges from 20 degrees to 40 degrees. In one embodiment, when being observed from the extending direction of the first axis (X), the included angle (θ) ranges from 30 degrees to 32 degrees.

It is noted that, if the included angle (θ) is smaller than 20 degrees, components in the embodiment may interfere with each other. If the included angle (θ) is greater than 40 degrees, the embodiment may have an overly large size.

Referring to FIGS. 4 to 7, the frame 73 is connected to the cap rail 72, and includes two side plates 731 that are spaced apart from each other along the third axis (Z), a cover plate 732 that interconnects the side plates 731 and that is spaced apart from the cap rail 72, and a guide rail 733 that is connected to the cover plate 732 and that extends in the extending direction of the third axis (Z).

The cap solenoid valve 74 is mounted to the cap rail 72, is mounted between the side plates 731 of the frame 73, is signally connected and electrically coupled to the control unit 63 (see FIG. 3), and is electrically coupled to the battery unit 64. The cap solenoid valve 74 includes a valve rod 741 that extends through the side plates 731 and that is drivable by an electromagnetic force to move in the extending direction of the third axis (Z). The valve rod 741 includes a positioning portion 742 that is slidable along the guide rail 733. Hence, the valve rod 741 may move steadily and smoothly in the extending direction of the third axis (Z).

The cap pushing member 75 is swingably connected to the valve stem 741, and has a main plate 751, two lug seats 752 that are connected to an end of the main plate 751 and that are respectively located at two opposite sides of the valve rod 741, two abutment portions 753 that are connected to another end of the main plate 751, and an extension portion 754 that is connected to one side of the main plate 751. Each of the abutment portions 753 has an abutment surface 755 that is adapted for abutting against an adjacent one of the caps 82, and a sloping surface 756 that is opposite to the abutment surface 755. The extension portion 754 extends through the elongated hole 725 of the cap rail 72, and has a stop surface 757 that is operable to abut against the second surface 724 of the cap rail 72 so that an angle of a swinging movement of the cap pushing member 75 may be limited. The cap pushing member 75 is urged by the valve rod 741 to move relative to the muzzle 2 between a first position (see FIG. 7) and a second position. When the cap pushing member 75 is in the first position, the cap pushing member 75 is adjacent to the muzzle 2, and the abutment portions 753 of the cap pushing member 75 are located at one side of the adjacent one of the caps 82 that is distal from the cartridge 71. When the cap pushing member 75 is in the second position, the cap pushing member 75 is distal from the muzzle 2, and the abutment portions 753 of the cap pushing member 75 are located at another side of the adjacent one of the caps 82 that is proximate to the cartridge 71.

The pin element 76 extends through the lug seats 752 of the cap pushing member 75 and the valve rod 741 such that the cap pushing member 75 is swingable about the pin element 76.

The resilient element 77 is mounted between the valve rod 741 and the cap pushing member 75, and resiliently biases the cap pushing member 75 toward the cap rail 72 such that the abutment portions 753 of the cap pushing member 75 abut against the cap rail 72.

In this embodiment, the restoring element 78 is mounted between the frame 73 and the valve rod 741, and is a resilient member that resiliently abuts against the frame 73 and the positioning portion 742 of the valve rod 741. Specifically, the restoring element 78 is sleeved on the valve rod 741, and resiliently abuts against the positioning portion 742 and one of the side plates 731 of the frame 73. The restoring element 78 is operable to generate a restoring force that pushes the valve rod 741 to move the cap pushing member 75 toward the first position.

Referring to FIGS. 5, 7, 8, and 9, when the cap solenoid valve 74 is energized, the cap solenoid valve 74 generates the electromagnetic force that drives the valve rod 741 to move the cap pushing member 75 toward the second position (i.e., the valve rod 741 is driven by the restoring force and the electromagnetic force to urge the cap pushing member 75 to move between the first position and the second position). When the cap pushing member 75 is urged by the electromagnetic force to move from the first position toward the second position, the abutment portions 753 of the cap pushing member 75 are adapted to be pushed by the adjacent one of the caps 82 such that the cap pushing member 75 presses the resilient element 77 and swings away from the cap rail 72 until the stop surface 757 of the extension portion 754 abuts against the second surface 724 of the cap rail 72. At this time, the angle of the swinging movement of the cap pushing member 75 just allows the cap pushing member 75 to slip off the adjacent one of the caps 82 such that the abutment portions 753 of the cap pushing member 75 are moved from the one side of the adjacent one of the caps 82 that is distal from the cartridge 71 to the another side of the adjacent one of the caps 82 that is proximate to the cartridge 71. When the cap solenoid valve 74 is de-energized and when the cap pushing member 75 is urged by the restoring force provided by the restoring element 78 to move from the second position toward the first position, the abutment portions 753 of the cap pushing member 75 abut against the adjacent one of the caps 82 and the cap rail 72 such that the cap pushing member 75 is prevented from swinging by the adjacent one of the caps 82 and the cap rail 72, and that the cap pushing member 75 pushes the adjacent one of the caps 82 toward the intersection point (Z1). By virtue of the cap pushing member 75 moving repeatedly between the first position and the second position, the abutment portions 753 push the caps 82 one by one toward the intersection point (Z1). Specifically, each time when the cap pushing member 75 is moved from the second position to the first position, the abutment portions 753 push one of the caps 82 that is farthest from the cartridge 71 (i.e., the adjacent one of the caps 82) toward the intersection point (Z1) such that the one of the caps 82 which is farthest from the cartridge 71 leaves the cap rail 72 and stays at the intersection point (Z1) when the cap pushing member 75 is in the first position.

Figure 9:
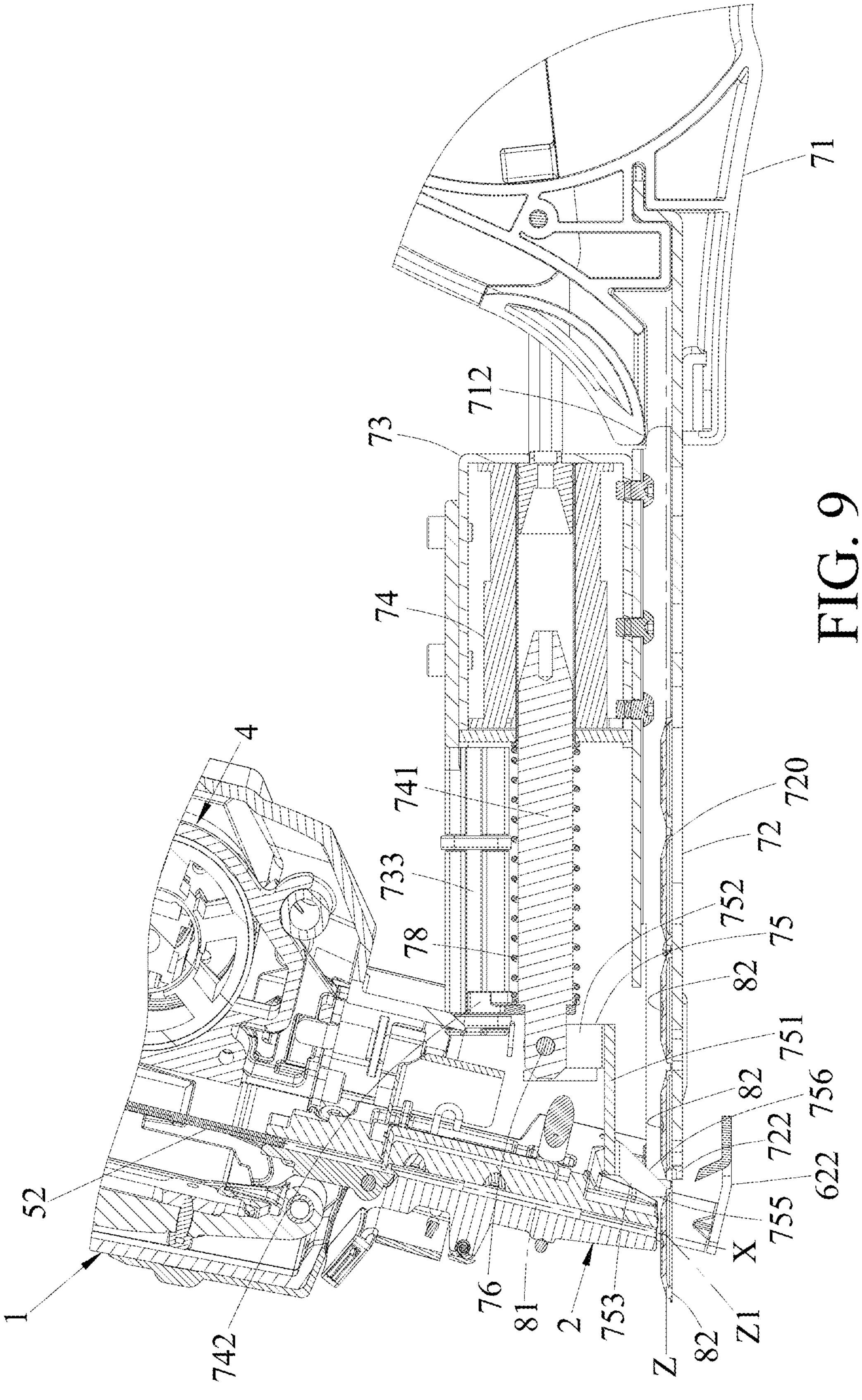
FIG. 9 is a view similar to FIG. 7, but illustrating a cap being located at an intersection point.

Referring to FIGS. 1, 3, and 9, when the cap nailer is in an initial state, the swing arm unit 43 is distal from the flywheel 41, the muzzle 2 accommodates one of the nails 81, and one of the caps 82 that is farthest from the cartridge 71 stays at the intersection point (Z1).

When the safety member 622 is pressed against a substrate (not shown) and when the user operates the trigger 612, the safety switch 621 outputs the safety signal and the trigger switch 611 outputs the activation signal. When the control unit 63 receives the safety signal and the activation signal, the control unit 63 activates the motor 42 to drive the flywheel 41 to rotate, and urges the swing arm solenoid valve 44 to urge the swing arm unit 43 to pivot toward the flywheel 41. During pivoting movement of the swing arm unit 43, the swing arm unit 43 urges the impact member 51 to be in contact with the flywheel 41 so that the impact member 51 may be thrown by the rotation of the flywheel 41 to urge the nail striking member 52 to strike the one of the nails 81 that is accommodated in the muzzle 2 along the first axis (X). Consequently, the one of the nails 81 that is in the muzzle 2 is struck.

When the one of the nails 81 is struck, the one of the nails 81 is moved along the first axis (X) and ejected from the muzzle 2. During this time, the one of the nails 81 passes through the intersection point (Z1) along the first axis (X) and nails the one of the caps 82 that is at the intersection point (Z1), and, if there is a sheet object (not shown) between the substrate and the one of the caps 82 at the intersection point (Z1), the one of the nails 81 then nails the sheet object and the substrate. Consequently, the sheet object is secured between the substrate and the one of the caps 82, and the one of the caps 82 presses against the sheet object.

Figure 7:
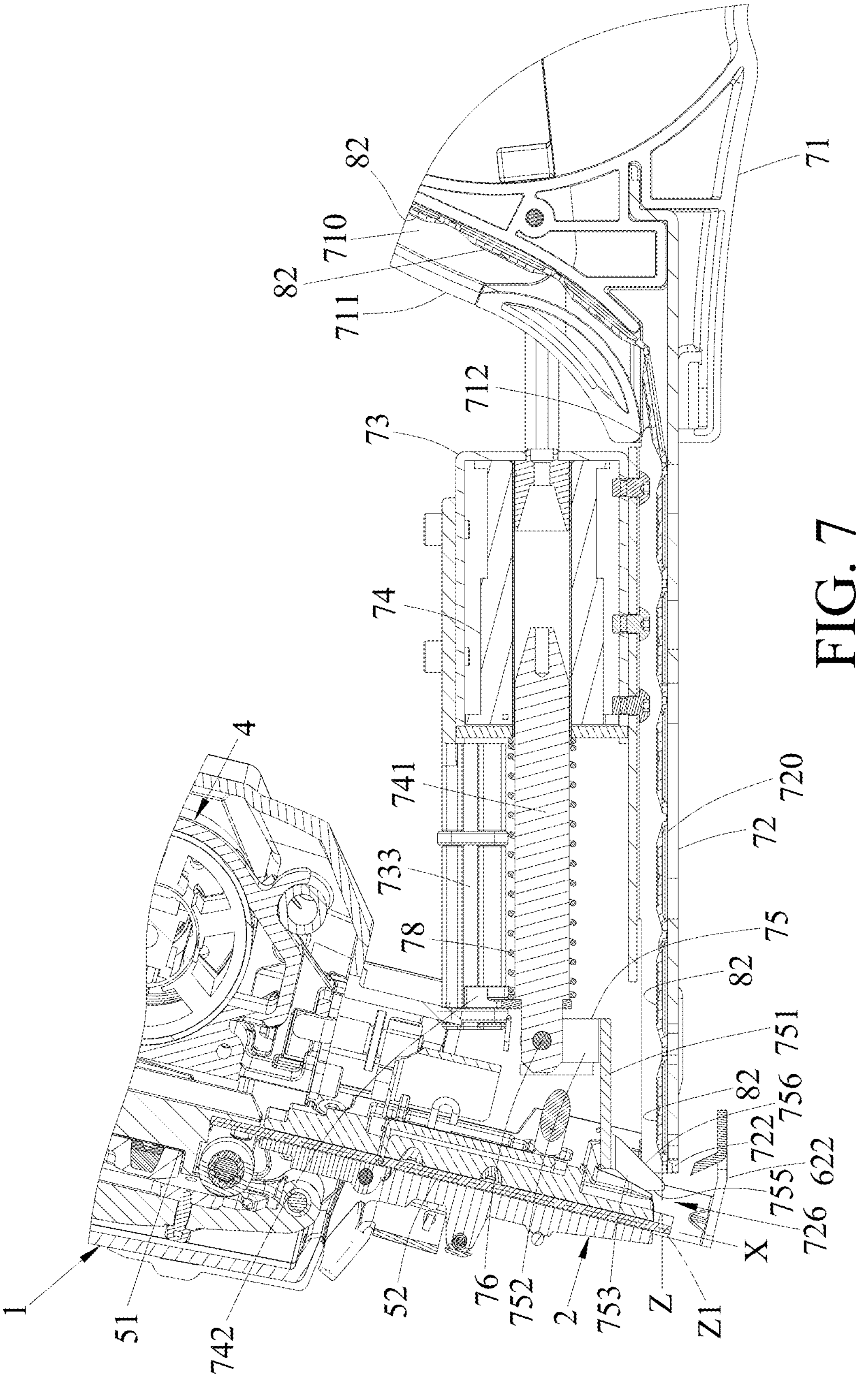
FIG. 7 is a fragmentary sectional view of the embodiment, illustrating a cap pushing member being in a first position.
Figure 8:
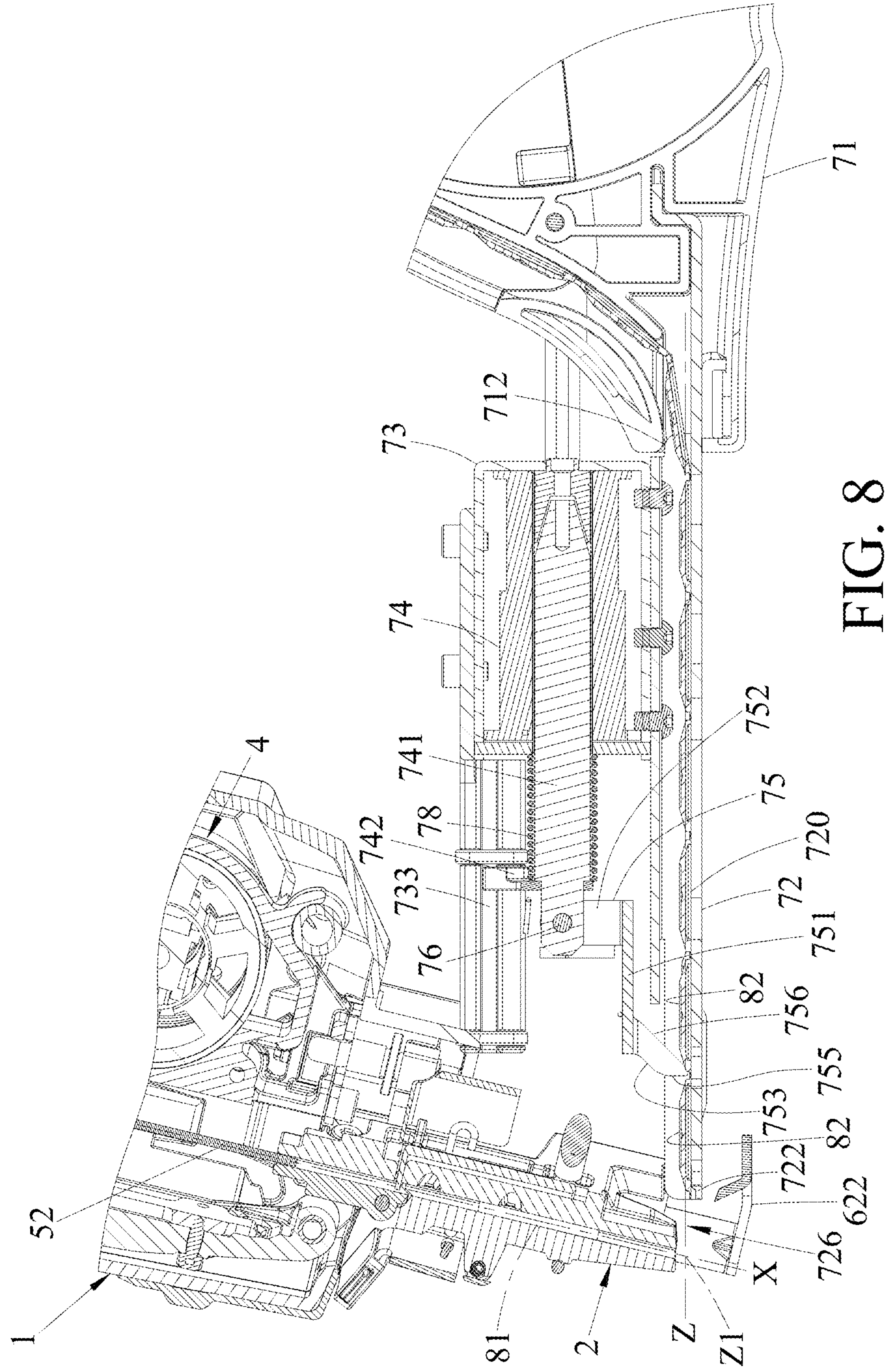
FIG. 8 is a view similar to FIG. 7, but illustrating the cap pushing member in a second position.

Referring to FIGS. 3, 7, and 9, the safety member 622 is not pressed against the substrate and when the user releases the trigger 612, the control unit 63 loses the safety signal and the activation signal. At this time, the control unit 63 energizes the cap solenoid valve 74 for a predetermined time (T) (e.g., 2 seconds). During the predetermined time (T), the valve rod 741 is driven by the electromagnetic force to move the cap pushing member 75 from the first position toward the second position such that the cap pushing member 75 are located at the another side of the adjacent one of the caps 82 (i.e., the cap 82 that is next to the one of the caps 82 which is just nailed by the one of the nails 81, and that is farthest from the cartridge 71 now) that is proximate to the cartridge 71. After the predetermined time (T), the cap solenoid valve 74 is de-demagnetized, and the valve rod 741 is driven by the restoring force of the restoring element 78 to urge the cap pushing member 75 to move from the second position toward the first position so that the cap pushing member 75 may push the adjacent one of the caps 82 (i.e., the cap 82 that is farthest from the cartridge 71 now) to the intersection point (Z1). Therefore, as the cap pushing member 75 repeatedly moves between the first position and the second position, the caps 82 are pushed to the intersection point (Z1) one by one.

Figure 10:
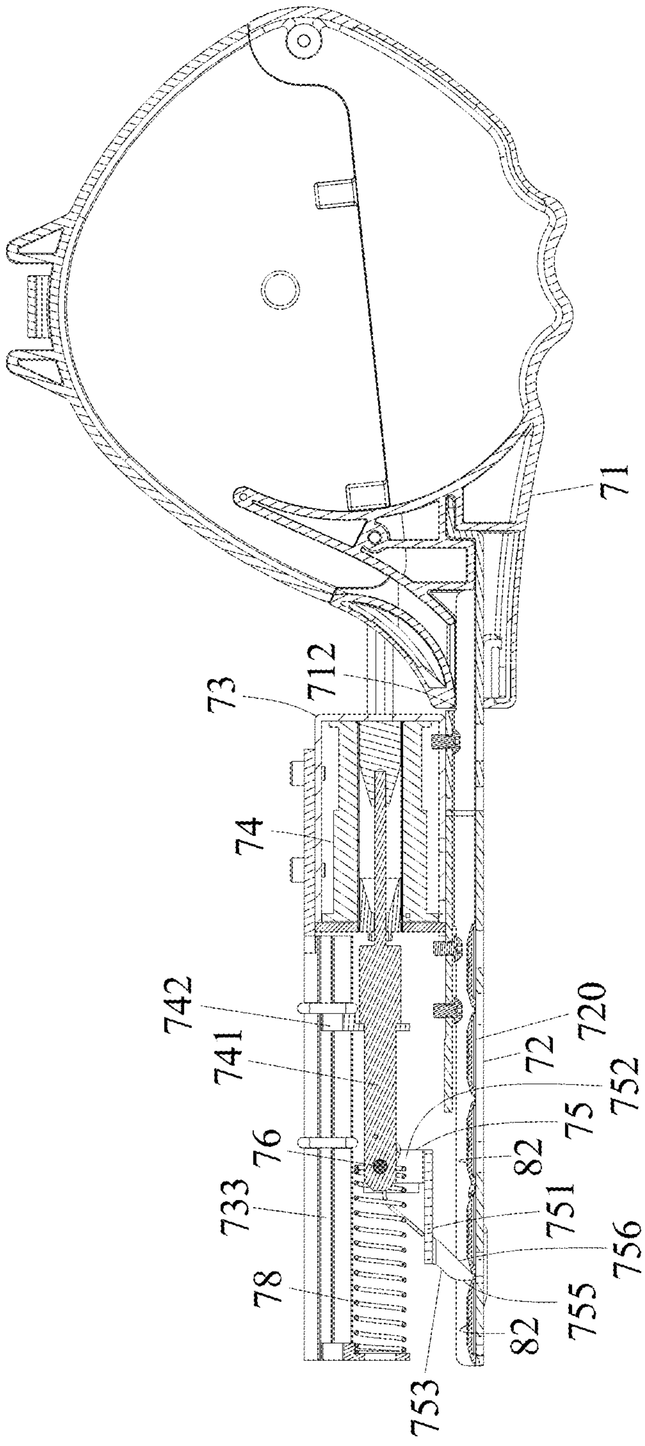
FIG. 10 is a sectional view of a modification of the cap feeding device, illustrating the cap pushing member being in the second position.
Figure 11:
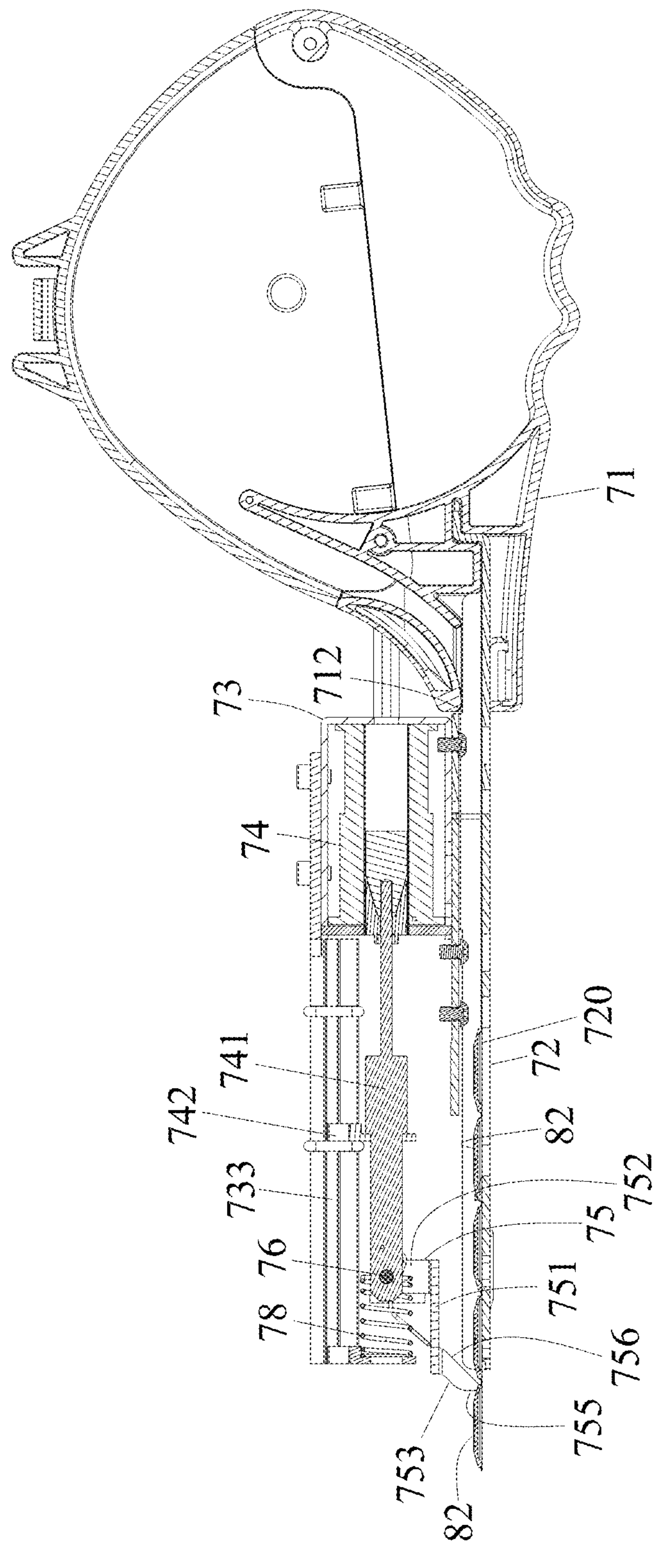
FIG. 11 is a view similar to FIG. 10, but illustrating the cap pushing member being in the first position.

It is noted that, the restoring force may not be limited to a force that moves the cap pushing member 75 toward the first position. In a modification of this embodiment, as shown in FIGS. 10 and 11, the restoring element 78 is a resilient member that resiliently abuts against the frame 73 and the pin element 76, and generates a restoring force that pushes the valve rod 741 to move the cap pushing member 75 toward the second position. In this modification, when the cap solenoid valve 74 is energized, the cap solenoid valve 74 generates an electromagnetic force that drives the valve rod 741 to move the cap pushing member 75 toward the first position and compress the restoring element 78. When the cap solenoid valve 74 is de-energized, the restoring element 78 releases the restoring force to move the cap pushing member 75 from the first position to the second position. As such, the caps 82 may also be pushed to the intersection point (Z1) one by one as the cap pushing member 75 repeatedly moves between the first position and the second position.

Referring to FIGS. 1, 3, 12, and 13, it is noted that, the control unit 63 activates the motor 42 and starts a nail striking operation when receiving any one of the activation signal and the safety signal. When the control unit 63 receives both of the activation signal and the safety signal, the control unit 63 urges the swing arm solenoid valve 44 to urge the swing arm unit 43 to pivot relative to the flywheel 41 such that any one of the nails 81 that is in the muzzle 2 is struck. When the control unit 63 loses the safety signal, the control unit 63 energizes the cap solenoid valve 74 for the predetermined time (T). When the control unit 63 loses both of the activation signal and the safety signal, the control unit 63 terminates the nail striking operation.

Figure 12:
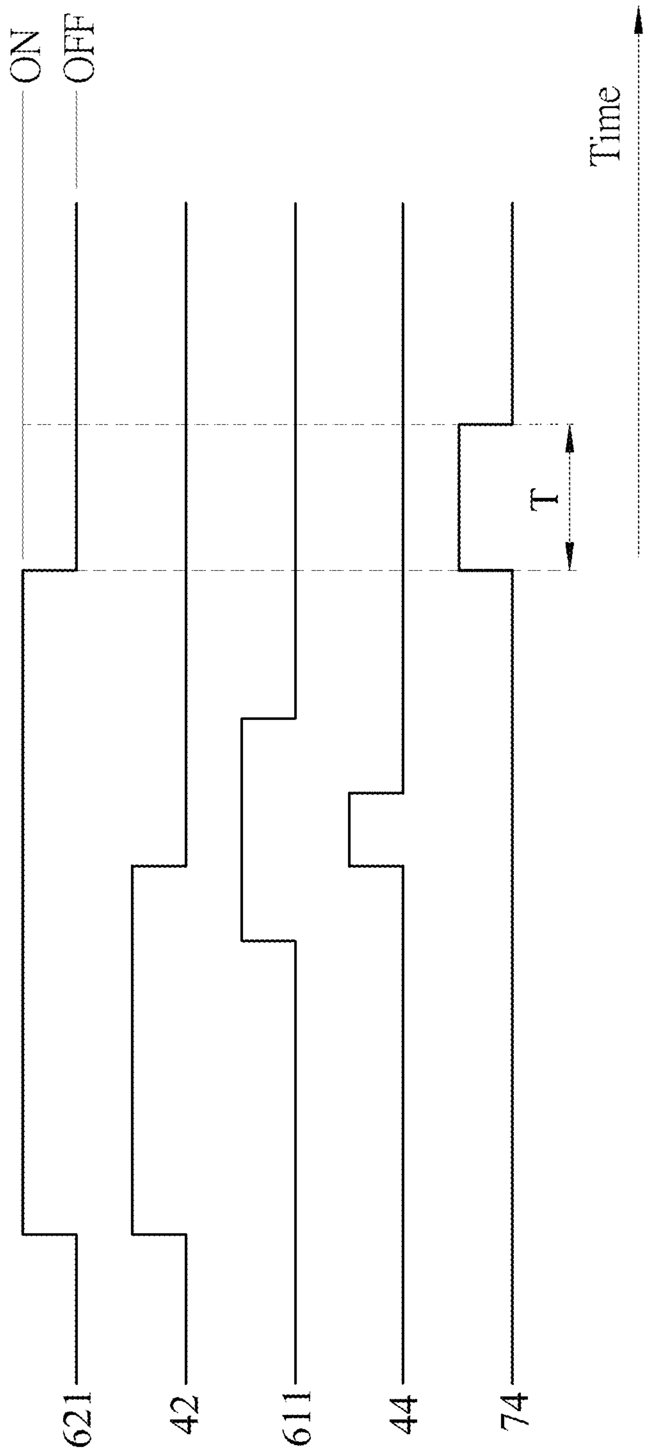
FIG. 12 is a timing diagram of an electric control system of the embodiment.

Therefore, the cap nailer provides two modes of the nail striking operation according to chronological order of operations of the trigger 612 and the safety member 622. Referring to FIGS. 3 and 12, when the safety member 622 is first pressed against the substrate, the safety switch 621 first outputs the safety signal. Afterwards, when the trigger 612 is pressed by the user, the trigger switch 611 outputs the activation signal such that the cap nailer is in a single-shot mode. In the single-shot mode, each of the trigger 612 and the safety member 622 may only be operated once to strike only one of the nails 81 and only one of the caps 82 during the entire nail striking operation (i.e., the user has to release both of the safety member 622 and the trigger 612 before the user starts another nail striking operation). In the single-shot mode, once the motor 42 is de-activated, the motor 42 may not be activated again until the another nail striking operation starts. In addition, in the single-shot mode, when the control unit 63 loses the safety signal, the control unit 63 energizes the cap solenoid valve 74 for the predetermined time (T) so that the caps 82 may be pushed to the intersection point (Z1) one by one among the nail striking operations.

Figure 13:
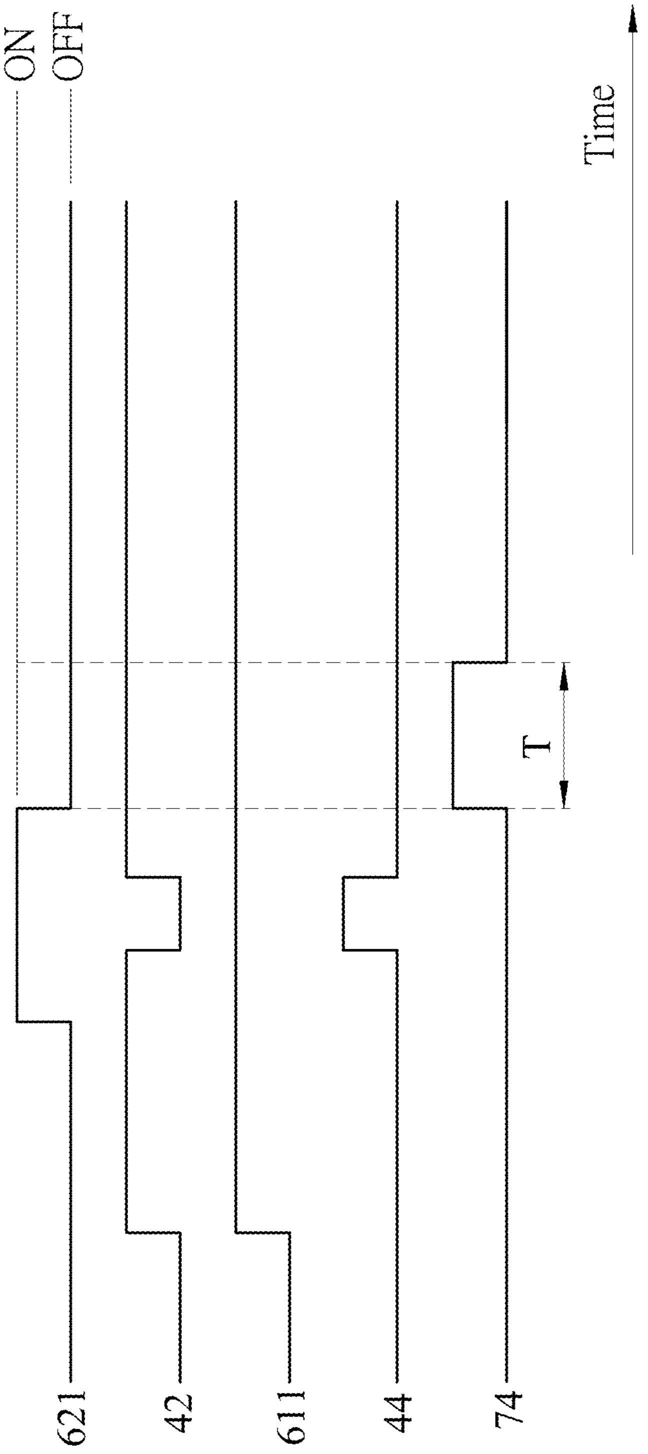
FIG. 13 is another timing diagram of the electric control system of the embodiment.

As shown in FIGS. 3 and 13, when the trigger 612 is first continuously pressed by the user, the trigger switch 611 first outputs the activation signal continuously. Afterwards, when the safety member 622 is intermittently operated, the safety switch 621 intermittently outputs the safety signal such that the cap nailer is in a repeating mode. In the repeating mode, each time the safety member 622 is operated, one of the nails 81 and one of the caps 82 are struck. When the user releases both of the trigger 612 and the safety member 622, the control unit 63 terminates the nail striking operation (i.e., the cap nailer is not in the repeating mode). When the cap nailer is in the repeating mode, each time when the control unit 63 loses the safety signal, the control unit 63 energizes the cap solenoid valve 74 for the predetermined time (T) so that the caps 82 may be pushed to the intersection point (Z1) one by one during one nail striking operation.

Through the above description, advantages of the cap nailer are summarized as follows:

1. By virtue of the cap feeding device 7 pushing the caps 82 via the electromagnetic force, a timing of the cap pushing member 75 pushing the caps 82 may be determined by electric control, and the electromagnetic force may be exerted on the restoring element 78 such that the restoring element 78 generates the restoring force. Consequently, structure of the cap nailer is simplified, and smoothness of the nail striking operation is improved.

2. By virtue of the cap feeding device 7 being independent from the nail feeding device 3, and by virtue of operation of the cap feeding device 7 being not involved with that of the nail feeding device 3, the cap feeding device 7 may be used for common electric nail guns that are on the market without modifying original nail-striking configurations of the electric nail guns. Thus, the cap feeding device 7 does not incur a high manufacturing cost, and is easy to be assembled and disassembled for maintenance.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A cap feeding device for a cap nailer, the cap nailer including a machine body, a muzzle that is connected to the machine body and that extends in an extending direction of a first axis, a nail feeding device that is connected to the muzzle and that is operable to push a plurality of nails in an extending direction of a second axis such that the nails enter the muzzle one by one, a nail striking device that is mounted to the machine body and that is drivable by an electric power to strike any one of the nails which is in the muzzle, and an electronic control device that is mounted to the machine body and that includes a battery unit for supplying electrical energy, the cap feeding device comprising:

a cartridge connected to the machine body and adapted for accommodating a plurality of caps;

a cap rail connected to the cartridge and extending toward the muzzle in an extending direction of a third axis, the cap rail being adapted for urging the caps to be arranged therealong in the extending direction of the third axis, the third axis and the first axis intersecting and cooperatively defining an intersection point that is spaced apart from the muzzle, the third axis and the second axis defining an included angle therebetween;

a cap solenoid valve mounted to the cap rail and including a valve rod that is drivable by an electromagnetic force to move in the extending direction of the third axis; and a cap pushing member swingably connected to the valve rod, and urged by the valve rod to move relative to the muzzle between a first position, in which the cap pushing member is adjacent to the muzzle, and a second position, in which the cap pushing member is distal from the muzzle, the cap pushing member being adapted to be pushed by an adjacent one of the caps to swing away from the cap rail and slip off the adjacent one of the caps when the cap pushing member is urged to move from the first position toward the second position, the cap pushing member being prevented from swinging by the adjacent one of the caps and the cap rail and being adapted to push the adjacent one of the caps toward the intersection point when the cap pushing member is urged to move from the second position toward the first position;

wherein the cap feeding device further comprises a frame and a restoring element, the frame being connected to the cap rail, the cap solenoid valve being mounted to the frame, the restoring element being mounted between the frame and the valve rod and being operable to generate a restoring force, the valve rod being driven by the electromagnetic force to urge the cap pushing member to move toward the second position, the valve rod being driven by the restoring force to urge the cap pushing member to move toward the first position;

wherein the cartridge defines an outlet that is adapted for the caps to pass through, the cap rail having an import end that is adjacent to the outlet, an export end that is opposite to the import end and that is adjacent to the muzzle, a first surface that interconnects the import end and the export end, and that cooperates with the import end and the export end to define a rail slot, a second surface that is opposite to the first surface, and an elongated hole that extends from the first surface to the second surface, and that is elongated in the extending direction of the third axis; and wherein the cap pushing member has a main plate, two lug seats that are connected to an end of the main plate and that are respectively located at two opposite sides of the valve rod, two abutment portions that are connected to another end of the main plate, and an extension portion that is connected to one side of the main plate, each of the abutment portions having an abutment surface that is adapted for abutting against the adjacent one of the caps, and a sloping surface that is opposite to the abutment surface, the extension portion extending through the elongated hole of the cap rail, and having a stop surface that is operable to abut against the second surface of the cap rail so that an angle of a swinging movement of the cap pushing member is limited.

2. A cap feeding device for a cap nailer, the cap nailer including a machine body, a muzzle that is connected to the machine body and that extends in an extending direction of a first axis, a nail feeding device that is connected to the muzzle and that is operable to push a plurality of nails in an extending direction of a second axis such that the nails enter the muzzle one by one, a nail striking device that is mounted to the machine body and that is drivable by an electric power to strike any one of the nails which is in the muzzle, and an electronic control device that is mounted to the machine body and that includes a battery unit for supplying electrical energy, the cap feeding device comprising:

a cartridge connected to the machine body and adapted for accommodating a plurality of caps;

a cap rail connected to the cartridge and extending toward the muzzle in an extending direction of a third axis, the cap rail being adapted for urging the caps to be arranged therealong in the extending direction of the third axis, the third axis and the first axis intersecting and cooperatively defining an intersection point that is spaced apart from the muzzle, the third axis and the second axis defining an included angle therebetween;

a cap solenoid valve mounted to the cap rail and including a valve rod that is drivable by an electromagnetic force to move in the extending direction of the third axis; and a cap pushing member swingably connected to the valve rod, and urged by the valve rod to move relative to the muzzle between a first position, in which the cap pushing member is adjacent to the muzzle, and a second position, in which the cap pushing member is distal from the muzzle, the cap pushing member being adapted to be pushed by an adjacent one of the caps to swing away from the cap rail and slip off the adjacent one of the caps when the cap pushing member is urged to move from the first position toward the second position, the cap pushing member being prevented from swinging by the adjacent one of the caps and the cap rail and being adapted to push the adjacent one of the caps toward the intersection point when the cap pushing member is urged to move from the second position toward the first position;

wherein the cartridge defines an outlet that is adapted for the caps to pass through, the cap rail having an import end that is adjacent to the outlet, an export end that is opposite to the import end and that is adjacent to the muzzle, a first surface that interconnects the import end and the export end, and that cooperates with the import end and the export end to define a rail slot, a second surface that is opposite to the first surface, and an elongated hole that extends from the first surface to the second surface, and that is elongated in the extending direction of the third axis; and wherein the cap pushing member has a main plate, two lug seats that are connected to an end of the main plate and that are respectively located at two opposite sides of the valve rod, two abutment portions that are connected to another end of the main plate, and an extension portion that is connected to one side of the main plate, each of the abutment portions having an abutment surface that is adapted for abutting against the adjacent one of the caps, and a sloping surface that is opposite to the abutment surface, the extension portion extending through the elongated hole of the cap rail, and having a stop surface that is operable to abut against the second surface of the cap rail so that an angle of a swinging movement of the cap pushing member is limited.

3. The cap feeding device as claimed in claim 2, further comprising a frame and a restoring element, the frame being connected to the cap rail, the cap solenoid valve being mounted to the frame, the restoring element being mounted between the frame and the valve rod and being operable to generate a restoring force, the valve rod being driven by the electromagnetic force to urge the cap pushing member to move toward the second position, the valve rod being driven by the restoring force to urge the cap pushing member to move toward the first position, the frame including a guide rail that extends in the extending direction of the third axis, the valve rod of the cap solenoid valve including a positioning portion that is slidable along the guide rail.

4. The cap feeding device as claimed in claim 3, wherein:

when the cap solenoid valve is energized, the cap solenoid valve generates the electromagnetic force that drives the valve rod to move the cap pushing member toward the second position; and the restoring element is a resilient member that resiliently abuts against the frame and the positioning portion of the valve rod, and generates the restoring force that pushes the valve rod to move the cap pushing member toward the first position.

5. The cap feeding device as claimed in claim 3, further comprising a pin element and a resilient element, the pin element extending through the cap pushing member and the valve rod such that the cap pushing member is swingable about the pin element, the cap pushing member having an abutment portion, the resilient element being mounted between the valve rod and the cap pushing member and resiliently biasing the cap pushing member toward the cap rail such that the abutment portion abuts against the cap rail.

6. A cap nailer comprising:

a machine body;

a muzzle connected to the machine body and extending in an extending direction of a first axis;

a nail feeding device connected to the muzzle, and adapted for pushing a plurality of nails in an extending direction of a second axis such that the nails enter the muzzle one by one;

a nail striking device mounted between the machine body and the muzzle, and drivable by an electric power to strike any one of the nails that is in the muzzle;

an electronic control device mounted to the machine body and including a battery unit for supplying electrical energy; and the cap feeding device as claimed in claim 2, the cap feeding device being disposed between the machine body and the muzzle.

7. The cap nailer as claimed in claim 6, further comprising a driving device, the driving device including a flywheel that is rotatably disposed on the machine body, a motor that is disposed on the machine body and that drives the flywheel to rotate, a swing arm unit that is pivotably connected to the machine body, and a swing arm solenoid valve that is disposed on the machine body and that is operable to urge the swing arm unit to pivot relative to the flywheel, the nail striking device including an impact member that is movably disposed on the swing arm unit and that is movable along the first axis, and a nail striking member that is connected to the impact member and that partially extends into the muzzle, the impact member being thrown by rotation of the flywheel to urge the nail striking member to strike any one of the nails that is in the muzzle when the impact member is urged by the swing arm unit to be in contact with the flywheel.

8. The cap nailer as claimed in claim 7, wherein the electronic control device further includes a control unit that is signally connected to the motor, the swing arm solenoid valve, and the cap solenoid valve, the battery unit being electrically coupled to the control unit and being for supplying the electric energy to the motor, the swing arm solenoid valve, and the cap solenoid valve.

9. The cap nailer as claimed in claim 8, wherein the electronic control device further includes a trigger unit and a safety unit, the trigger unit being mounted to the machine body, and including a trigger switch that is signally connected to the control unit, and a trigger that is operable, the trigger switch outputting an activation signal when the trigger is operated, the safety unit being disposed between the muzzle and the machine body, and including a safety switch that is signally connected to the control unit, and a safety member that is operable, the safety member and one end of the cap rail cooperatively defining a gap therebetween, the safety switch outputting a safety signal when the safety member is operated, the control unit being for receiving the activation signal and the safety signal, the control unit activating the motor and starting a nail striking operation when receiving any one of the activation signal and the safety signal, the control unit urging the swing arm solenoid valve to urge the swing arm unit to pivot relative to the flywheel when the control unit receives both of the activation signal and the safety signal such that any one of the nails that is in the muzzle is struck, the control unit energizing the cap solenoid valve for a predetermined time when the control unit loses the safety signal, the control unit terminating the nail striking operation when the control unit loses both of the activation signal and the safety signal.

10. The cap nailer as claimed in claim 6, wherein the nail feeding device includes a magazine that is connected to the machine body and the muzzle, and that is adapted for accommodating the nails, and a nail pushing member that is movably connected to the magazine and that is drivable by a biasing force, the nail pushing member being adapted for pushing the nails to move toward the muzzle along the second axis.

11. The cap nailer as claimed in claim 6, wherein, when being observed from the extending direction of the first axis, the included angle defined by the third axis and the second axis ranges from 20 degrees to 40 degrees.

12. The cap nailer as claimed in claim 6, wherein, when the cap pushing member is moved from the second position to the first position, the cap pushing member pushes the adjacent one of the caps toward the intersection point such that the adjacent one of the caps stays at the intersection point when the cap pushing member is in the first position, the intersection point that is defined by the third axis and the first axis being spaced apart from the muzzle along the first axis, the nail striking device striking any one of the nails that is in the muzzle along the first axis such that the any one of the nails passes through the intersection point along the first axis and nails the adjacent one of the caps.

13. A cap nailer comprising:

a machine body;

a muzzle connected to the machine body and extending in an extending direction of a first axis;

a nail feeding device connected to the muzzle, and adapted for pushing a plurality of nails in an extending direction of a second axis such that the nails enter the muzzle one by one;

a nail striking device mounted between the machine body and the muzzle, and drivable by an electric power to strike any one of the nails that is in the muzzle;

an electronic control device mounted to the machine body and including a battery unit for supplying electrical energy; and a cap feeding device disposed between the machine body and the muzzle;

wherein the cap feeding device includes a cartridge that is connected to the machine body and that is adapted for accommodating a plurality of caps, a cap rail that is connected to the cartridge and that extends toward the muzzle in an extending direction of a third axis, the cap rail being adapted for urging the caps to be arranged therealong in the extending direction of the third axis, the third axis and the first axis intersecting and cooperatively defining an intersection point that is spaced apart from the muzzle, the third axis and the second axis defining an included angle therebetween, a cap solenoid valve that is mounted to the cap rail and that includes a valve rod drivable by an electromagnetic force to move in the extending direction of the third axis, and a cap pushing member that is swingably connected to the valve rod, and that is urged by the valve rod to move relative to the muzzle between a first position, in which the cap pushing member is adjacent to the muzzle, and a second position, in which the cap pushing member is distal from the muzzle, the cap pushing member being adapted to be pushed by an adjacent one of the caps to swing away from the cap rail and slip off the adjacent one of the caps when the cap pushing member is urged to move from the first position toward the second position, the cap pushing member being prevented from swinging by the adjacent one of the caps and the cap rail and being adapted to push the adjacent one of the caps toward the intersection point when the cap pushing member is urged to move from the second position toward the first position;

wherein the cap nailer further comprises a driving device, the driving device including a flywheel that is rotatably disposed on the machine body, a motor that is disposed on the machine body and that drives the flywheel to rotate, a swing arm unit that is pivotably connected to the machine body, and a swing arm solenoid valve that is disposed on the machine body and that is operable to urge the swing arm unit to pivot relative to the flywheel, the nail striking device including an impact member that is movably disposed on the swing arm unit and that is movable along the first axis, and a nail striking member that is connected to the impact member and that partially extends into the muzzle, the impact member being thrown by rotation of the flywheel to urge the nail striking member to strike any one of the nails that is in the muzzle when the impact member is urged by the swing arm unit to be in contact with the flywheel;

wherein the electronic control device further includes a control unit that is signally connected to the motor, the swing arm solenoid valve, and the cap solenoid valve, the battery unit being electrically coupled to the control unit and being for supplying the electric energy to the motor, the swing arm solenoid valve, and the cap solenoid valve; and wherein the electronic control device further includes a trigger unit and a safety unit, the trigger unit being mounted to the machine body, and including a trigger switch that is signally connected to the control unit, and a trigger that is operable, the trigger switch outputting an activation signal when the trigger is operated, the safety unit being disposed between the muzzle and the machine body, and including a safety switch that is signally connected to the control unit, and a safety member that is operable, the safety member and one end of the cap rail cooperatively defining a gap therebetween, the safety switch outputting a safety signal when the safety member is operated, the control unit being for receiving the activation signal and the safety signal, the control unit activating the motor and starting a nail striking operation when receiving any one of the activation signal and the safety signal, the control unit urging the swing arm solenoid valve to urge the swing arm unit to pivot relative to the flywheel when the control unit receives both of the activation signal and the safety signal such that any one of the nails that is in the muzzle is struck, the control unit energizing the cap solenoid valve for a predetermined time when the control unit loses the safety signal, the control unit terminating the nail striking operation when the control unit loses both of the activation signal and the safety signal.

14. The cap nailer as claimed in claim 13, wherein, when being observed from the extending direction of the first axis, the included angle defined by the third axis and the second axis ranges from 20 degrees to 40 degrees.

15. The cap nailer as claimed in claim 13, wherein, when the cap pushing member is moved from the second position to the first position, the cap pushing member pushes the adjacent one of the caps toward the intersection point such that the adjacent one of the caps stays at the intersection point when the cap pushing member is in the first position, the intersection point that is defined by the third axis and the first axis being spaced apart from the muzzle along the first axis, the nail striking device striking any one of the nails that is in the muzzle along the first axis such that the any one of the nails passes through the intersection point along the first axis and nails the adjacent one of the caps.

16. The cap nailer as claimed in claim 13, wherein the nail feeding device includes a magazine that is connected to the machine body and the muzzle, and that is adapted for accommodating the nails, and a nail pushing member that is movably connected to the magazine and that is drivable by a biasing force, the nail pushing member being adapted for pushing the nails to move toward the muzzle along the second axis.

* * * * *